June 19, 1928.
J. D. WILLIS
1,674,383
ELECTRIC MOTOR
Filed Aug. 11, 1926
2 Sheets-Sheet 2
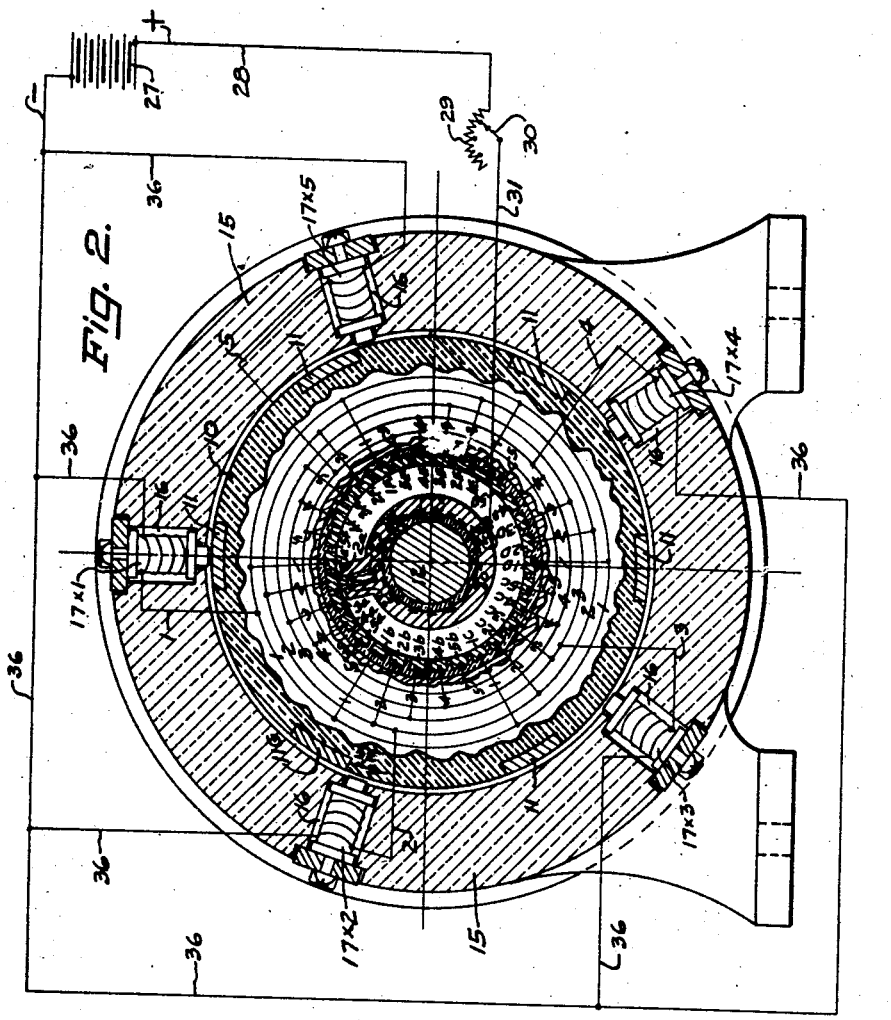
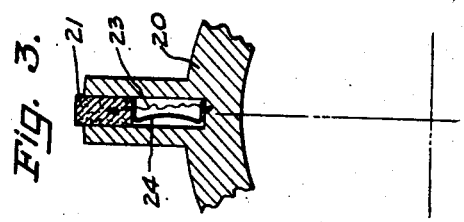
INVENTOR
JOHN D. WILLIS
BY
*George F Ballay*
ATTORNEY Patented June 19, 1928.

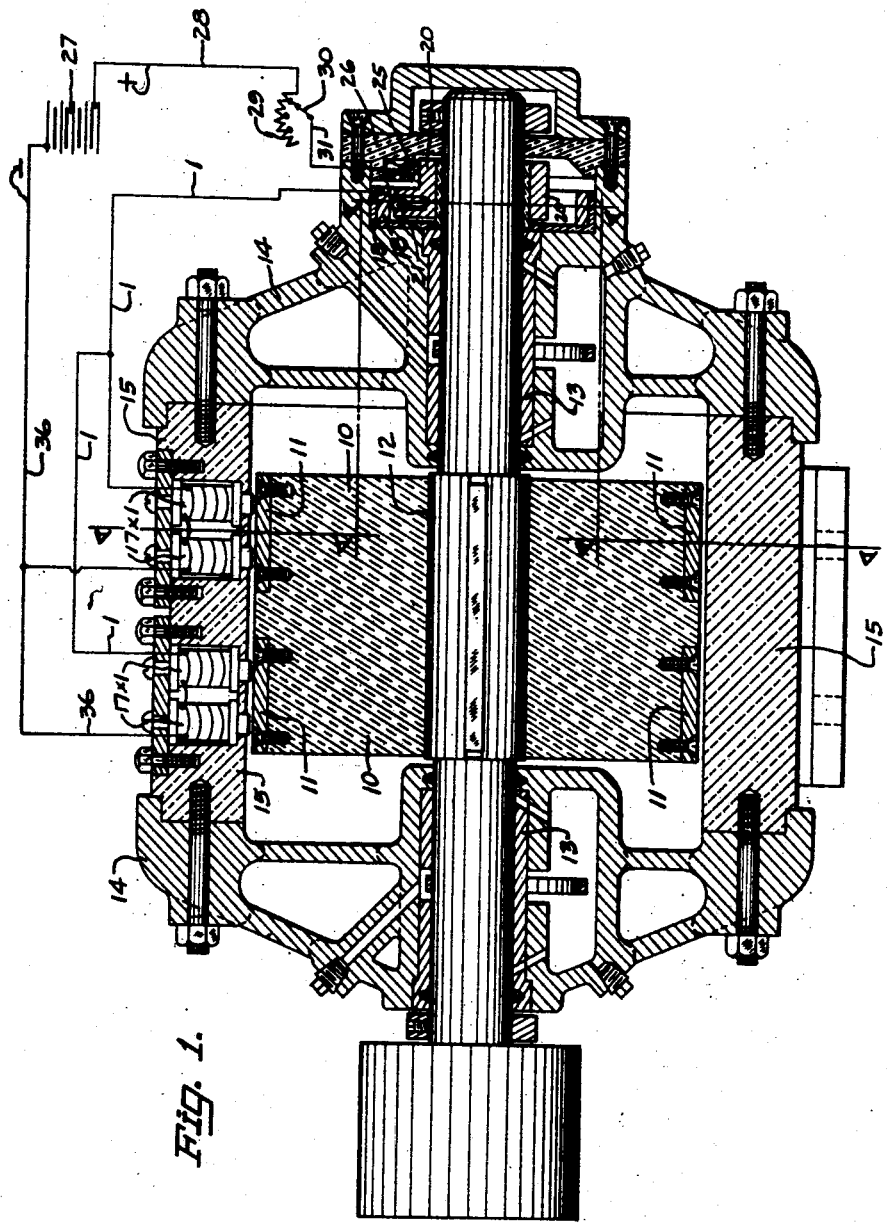

1,674,383

UNITED STATES PATENT OFFICE.

JOHN D. WILLIS, OF OAKLAND, CALIFORNIA.

ELECTRIC MOTOR.

Application filed August 11, 1926. Serial No. 128,574.

This invention relates to motors where electricity is used for the purpose of producing power.

In the usual type of such motors the rotor is provided with armature windings which have a tendency to prevent the magnets to be properly energized at low voltage, due to the resistance caused by said windings.

It is one of the objects of the present invention to eliminate the armature windings as used on the present type of motors.

It is another object of the invention to provide for an electric motor a rotor made out of non-magnetic material and to provide said rotor with a plurality of iron blocks or magnet metal pieces and to further provide the motor with a plurality of two-pole magnets and to mount said magnets in a drum also made of non-magnetic metal and to thereby create a more intense magnetic field, the iron blocks acting as a path for the magnetic flux.

It is a still further object of the invention to provide an electric motor that will be inexpensive in construction, simple in operation and superior in giving a very high efficiency.

The invention possesses other objects and features of advantage, some of which with the foregoing will be made manifest in the following description of the preferred form of the invention which is illustrated in the drawings accompanying and forming part of the specification.

It is to be understood that it is not intended to limit the invention to the embodiment shown by said drawings and descriptions, as variations may be adopted within the scope of the invention as set forth in the claim.

In the accompanying drawings:

Figure 1 is a central longitudinal sectional view of one type of electric motor involving the invention.

Figure 2 is an end sectional view taken on lines A—A; a portion being broken away to provide space to illustrate the wiring and the relation of the various magnets to the commutator.

Figure 3 is a sectional view illustrating a preferred way of holding the brushes that have contact with the collecting ring and the commutator.

According to the construction shown, the numeral 10 designates the rotor which is made out of non-magnetic material and provided with a plurality of magnet metal blocks 11 of equal width that are substantially fastened to the outer periphery of the rotor as shown in Figures 1 and 2. The rotor is rigidly secured to a shaft 12 having support in bearings 13 provided in the end bell 14. In the present illustration plain bearings and ring oiling means are shown, but it is to be understood that ball bearings and any type of oiling system may be used that will best accommodate the invention.

The outer housing or drum 15 preferably forms a substantial cylindrical chamber and is made of non-magnetic metal and is provided with a plurality of guide-forming recesses or pockets 16. In each of the pockets 16 there is radially mounted and securely fastened to the drum 15 a two-pole magnet 17, the innermost ends of the poles thereof extending into the chamber of the drum and coming quite close to the outer surface of the magnet metal blocks 11 provided on the outer periphery of the rotor 10.

It is to be particularly observed that the rotor is provided with an even number of magnet blocks and the drum with an uneven number of magnets and that the magnets are arranged in pairs and on each side of the vertical center of the drum and rotor, the object of which will be hereinafter explained.

Provision is made in one of the end bells 14 to hold a commutator 18 (Fig. 1) which is mounted in a container 19 that is made of electric insulation material and then fastened in said end bell 14 providing a commutator that is stationary and insulated from the end bell 14. A collecting ring 20 preferably made of copper and formed with an arm, so as to carry a brush 21, is provided and is fastened to the shaft and is insulated therefrom and is adapted to move the brush 21 around the inner periphery of the various segments of the commutator as shown in Figure 2. An electric conductor 23 of a length sufficient to allow the brush to have radial movement is connected to the brush 21 and to the collecting ring 20 as shown in Figure 3. A spring 24 is provided to insure good contact of the brush against the commutator. Another brush 25, adapted to have contact on the collecting ring 20, is provided and held in an insulated container 26 and connected to the electric conductor 31.

In describing the various electric conductors that lead from the source of supply 27 through the segments of the commutator through the magnets and back to the source of supply, it is to be noted that a portion of the rotor is broken away and conductors circular in form are shown. This is done to simplify the illustrating of the various electric conductors and their relation to the different segments of the commutator and the magnets and it is to be understood that said electric conductors are not in or a part of the rotor.

As hereinbefore mentioned, the commutator is stationary and the brush 21 travels around the inner periphery thereof. Electrical energy from the source of supply 27 is carried to the commutator through conductors 28, 29, 30 and 31 through brush 25 through collecting ring 20 through conductor 23 and brush 21.

In the present illustration the motor is provided with five sets of electric magnets and the commutator thirty separate segments. Each of the commutator segments is provided with an electric conductor all of which lead to their respective magnets, namely every fifth conductor relatively leads to one and the same magnet. For example, segments 2$^a$, 2$^b$, 2$^c$, 2$^d$, 2$^E$ and 2$^F$ are all connected to electric conductor 2 and all lead to magnet 17×2. Likewise, segment 3$^a$, 3$^b$, 3$^c$, 3$^d$, 3$^E$ and 3$^F$ are all connected to electric conductor 3 and all lead to magnet 17×3. Magnets 17×4, 17×5 and 17×1 are energized in a similar way through their respective commutator segments and conductors.

In Figure 2 the brush 21 is shown in contact with commutator segment 2$^a$. It will thus be observed that electrical energy flows from the source of supply 27 through conductors 28, 29, 30 and 31 through brush 25 through collecting ring 20 through conductor 23 through brush 21 through commutator segment 2$^a$ through conductor 2 through magnet 17×2 and back to the source of supply through return conductor 36 energizing magnet 17×2 exerting a magnetic traction on block 11$^G$ in direction of the arrow 35.

As hereinbefore mentioned, the motor is provided with five sets of magnets equally spaced on a circle making each magnet one fifth of 360° apart which is equal to 72°. The rotor is provided with six blocks equally spaced on a circle which is equal to 60° apart, making each magnet a distance of 12° further apart than the blocks. The commutator is provided with 30 separate segments making each segment 12° apart. It will thus be noted that each set of magnets are successively energized every 12° movement of the rotor and remain energized during said 12° movement until the following set of magnets become energized. The brush 21 is positioned on the rotor shaft with respect to the blocks 11, having the same relation to the commutator segments as the blocks have to the magnets, so as to always energize each magnet at the point when the portion of the block nearest the magnet is 12° from the magnet. For example, the brush 21 has contact with commutator segment 2$^a$ when the nearest portion of the block approaching magnet 17×2 is 12° from the center of said magnet, the said magnet remaining energized while the block 11$^G$ and the brush 21 moves 12°, after which said brush 21 reaches commutator segment 3$^a$ and the following block 11 comes within 12° of magnet 17×3, the remaining magnets becoming energized in a similar manner successively when the blocks 11 are the required distance from the magnets, exerting a continuous magnetic traction on the blocks 11, thus imparting movement to the rotor.

The brush may be of any type or width and located in any manner that will give the motor its highest efficiency. In the present illustration, the rotor is shown as running in an anticlockwise direction. When it is desired to run the rotor in a clockwise direction, the brush is adjusted so as to energize the magnets when the blocks are on the opposite side of the magnets as now illustrated. Two-pole magnets are preferably used and arranged in sets and on each side of the vertical center of the rotor as shown in Figure 1, to give the motor more power and better efficiency.

Having thus illustrated a certain form of construction and arrangement of parts pertaining to the invention, it is to be understood that the improvements may be embodied in any type of electric motor, which obviously may be built up in any suitable manner, the present illustration not being utilized as indicating the only form of motor in which the parts may be mounted; and it is desired to include in this application for Letters Patent of the United States of America, whatever features of patentable novelty that exist in the invention disclosed and all that comes within the range of the invention as set forth in the claim hereinafter mentioned.

What is claimed:

A machine, operative as an electric motor, having a drum made of non-magnetic material, a rotor made of non-magnetic material mounted therein, a plurality of magnetic metal pieces fastened to the rotor, a plurality of magnets, of a different number than the number of said magnetic metal pieces, fastened to the drum, a stationary commutator provided with a plurality of separate segments having electric conductors that lead to the magnets, a ring made of electric conducting material fastened on the rotor shaft and insulated therefrom, a stationary carbon brush having connection with the source of electrical energy and contact with said ring, and another carbon brush mounted on said ring and adapted to have moving contact on the various segments of the commutator.

In testimony that I claim the foregoing I have hereto set my hand this fifth day of August, 1926.

JOHN D. WILLIS.